Sept. 6, 1949. G. HERZOG 2,481,014
METHOD AND APPARATUS FOR RADIOACTIVITY WELL LOGGING
Filed March 22, 1945 3 Sheets-Sheet 1
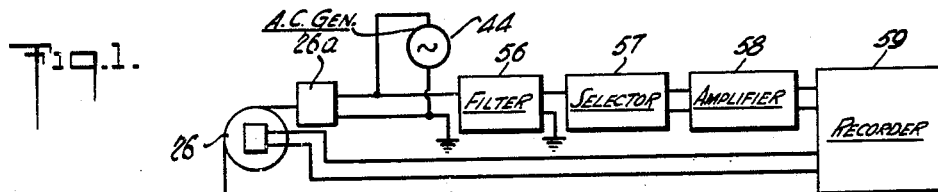
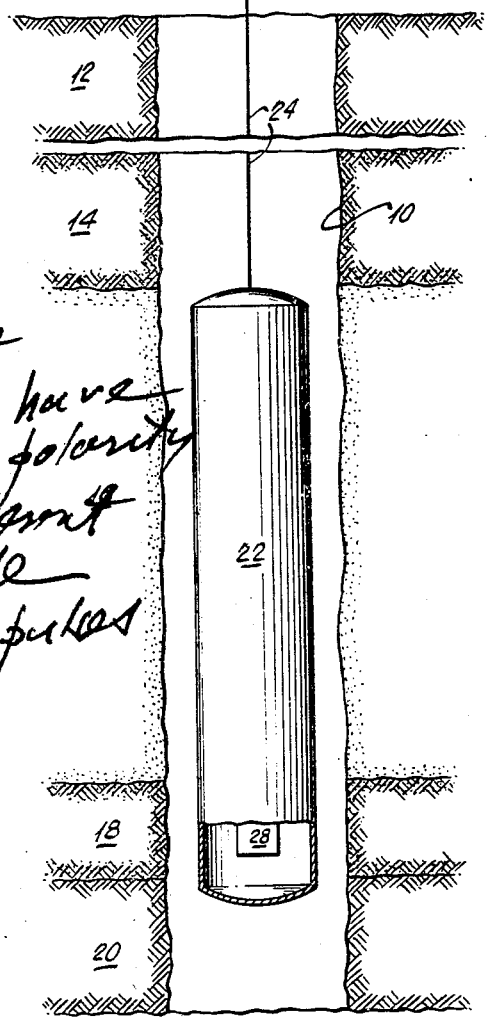
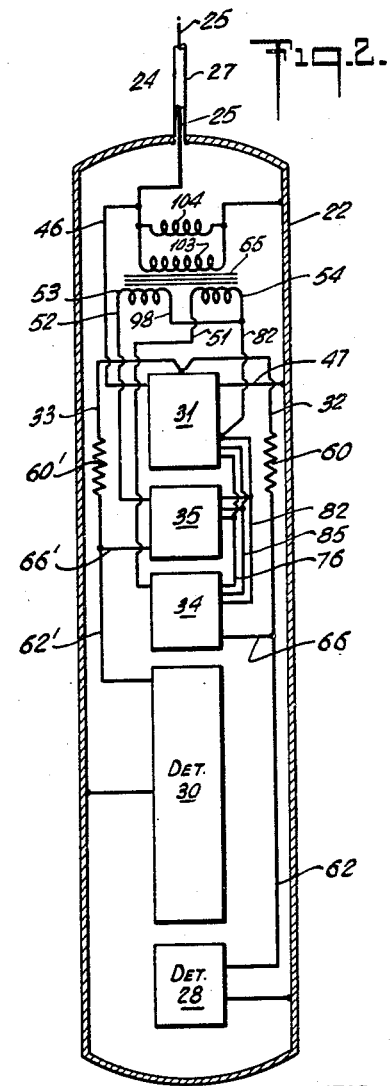
INVENTOR.
GERHARD HERZOG.
BY
ATTORNEY.

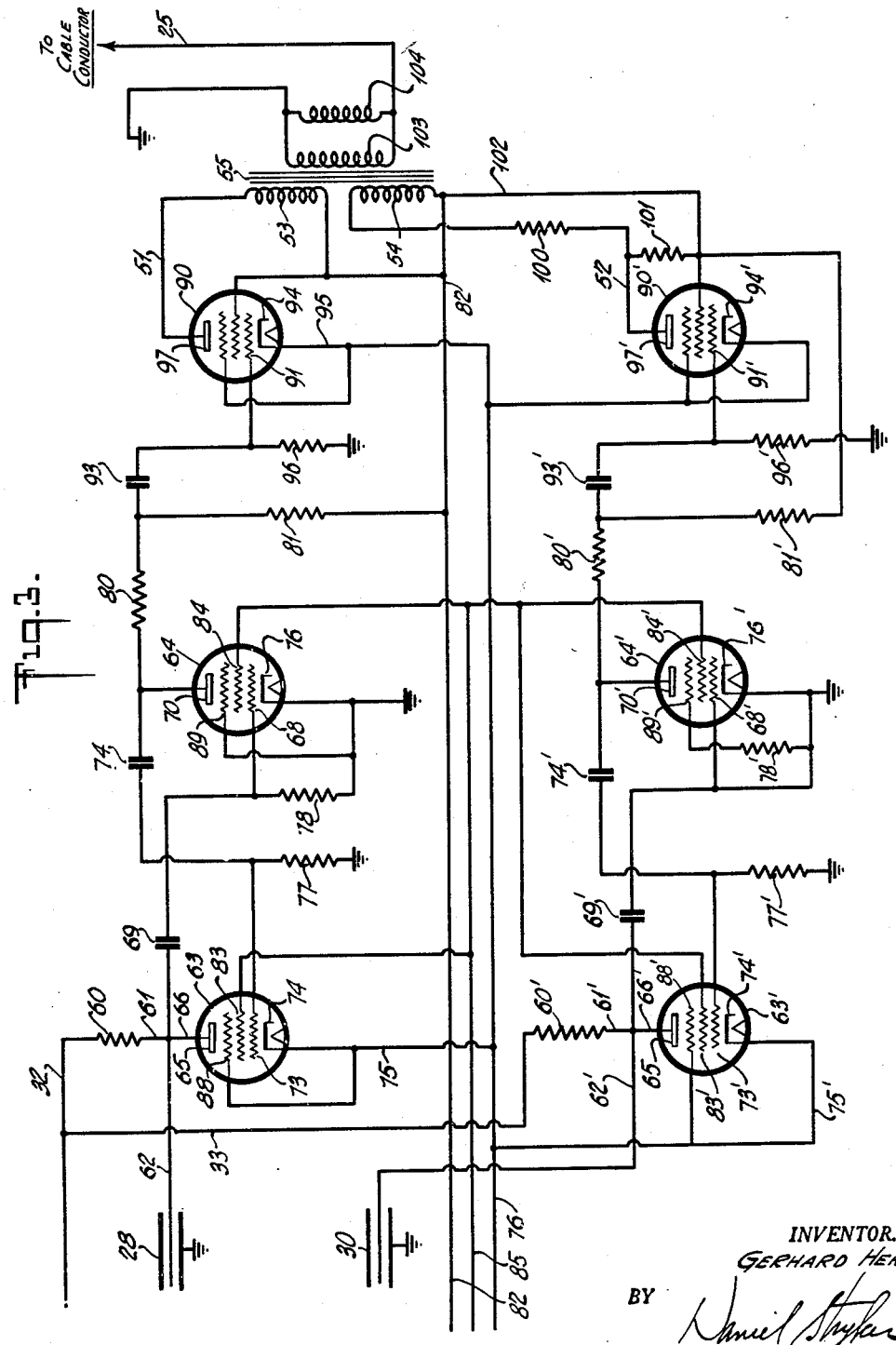

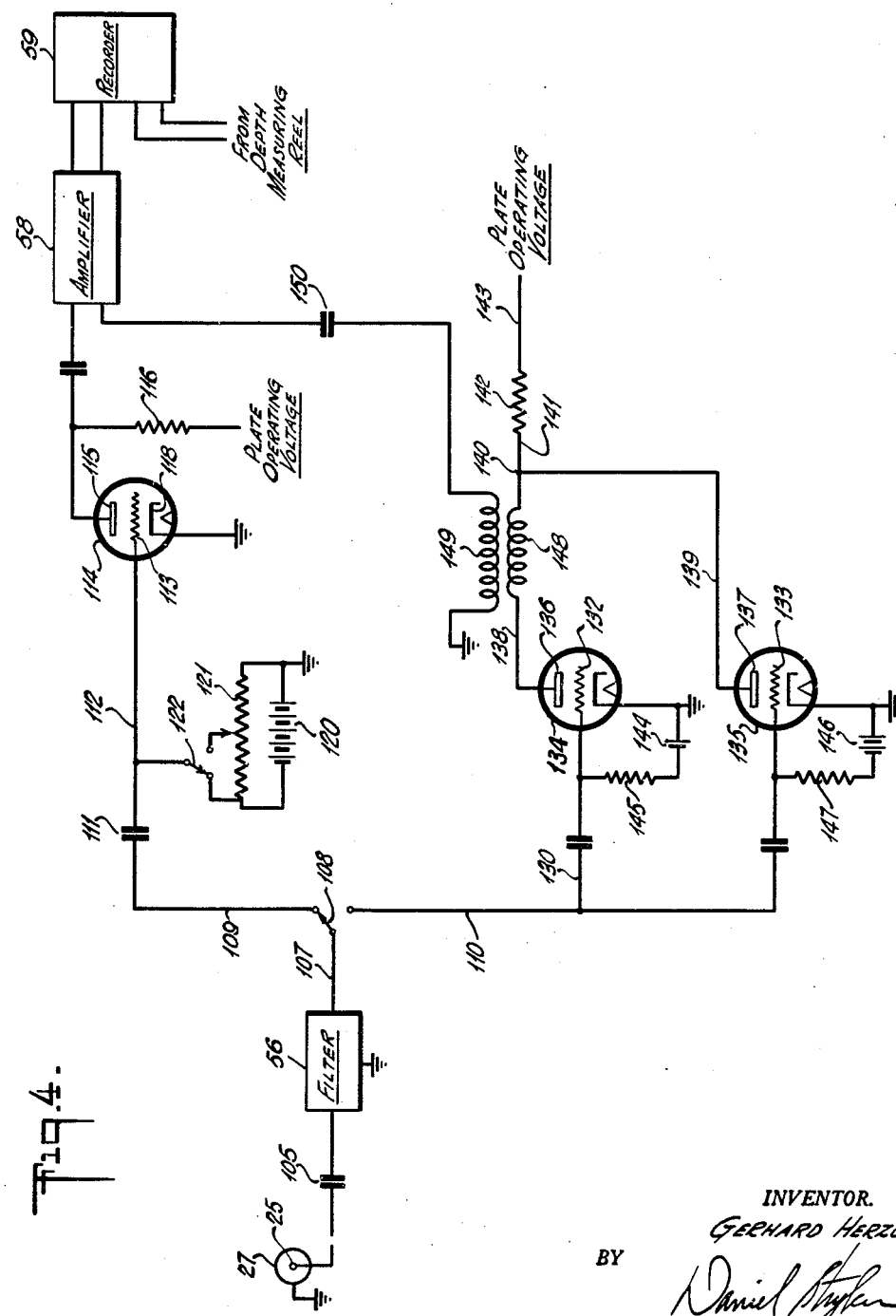

Patented Sept. 6, 1949

2,481,014

UNITED STATES PATENT OFFICE 2,481,014

METHOD AND APPARATUS FOR RADIO-ACTIVITY WELL LOGGING

Gerhard Herzog, Houston, Tex., assignor, by mesne assignments, to The Texas Company, New York, N. Y., a corporation of Delaware Application March 22, 1945, Serial No. 584,164

15 Claims. (Cl. 250—83.6)

1

This invention relates to a method and an apparatus for logging wells and bore-holes and more particularly to a method for determining the nature and location of the various formations or strata traversed by a bore-hole by measuring variations in the natural or induced radioactivity of the formations.

This application is a continuation-in-part of my prior application, Serial No. 460,198, filed September 30, 1942, now U. S. Letters Patent No. 2,378,408, granted June 19, 1945.

The principal object of the invention is to provide a method and equipment by means of which a bore-hole can be logged with accuracy as great as or greater than is possible with the present radiological methods, and at a speed several times greater than that possible with present equipment. In case extreme accuracy should be required, this method can be used with a logging speed at least as high as that now possible with present methods and apparatus.

It is now well-known that the concentration of radioactive substances in the earth varies considerably with changes in the stratigraphy and a close correlation between changes in the strata and their radioactive content can be made. Shales are usually the most radioactive while sandstones and limestones are less active. Measurements of radioactivity along the bore-hole or well, therefore, provide a good method of locating the various strata and distinguishing between adjoining formations. A radioactive logging detector passed through the hole measures the intensity of the gamma rays emitted from the formations, these rays being spontaneously emitted from the decaying radioactive atoms. The penetration power of these rays is relatively great and the absorption by $\frac{1}{4}''$ of steel casing is only about 20%, and it therefore is possible to obtain a good log through the casing in a well; moreover, the influence of the fluid in a well upon the measured intensity is practically negligible. If the annular space between the logging detector and the casing is filled with water or oil, the gamma ray intensity is reduced by only a small percentage. The radiological method therefore is able to produce accurate logs through the casing in wells filled with a fluid, where other logging methods are entirely unsatisfactory.

The speed with which a radioactive log can be taken is limited by the amount of detail or resolution one wishes to obtain. This resolution represents the thinnest stratum that can be identified. In the U. S. Letters Patent of myself and D. G. C. Hare, No. 2,397,073, granted March 19,

2

1946, and the patent of D. G. C. Hare, No. 2,397,071, granted March 19, 1946, forms of radiation detectors are disclosed which have proven to be many times more sensitive than ionization chambers and the conventional Geiger-Muller counters. The detector disclosed in Patent No. 2,397,073 comprises a plurality of elongated thin cathode plates disposed in slightly separated relation and a plurality of fine anode wires stretched between adjacent pairs of plates. The other detector disclosed in Patent No. 2,397,071 comprises a plurality of thin cathode discs disposed in parallel separated relation and arranged in a relatively long column. These discs are provided with several series of holes arranged in alignment and a thin anode wire is disposed so as to coincide with the longitudinal axis of each series. The cathode and anode of each detector is disposed in a suitable casing or envelope containing a gas at a comparatively low pressure and a source of potential of around 1000 volts is applied across the anode and cathode. A gamma ray striking one of the cathode plates may eject an electron into the gas, which electron is accelerated by the electric field from the cathode to the anode to such an extent that it ionizes the gas in the counter. New electrons and ions will thus be formed and these are accelerated by the electric field and in turn produce still additional new ions and electrons. The charge is collected on the anode and produces a comparatively high current pulse of the order of one microampere. These pulses can be amplified easily and fed through the logging cable to the surface.

The detectors described can be made of various lengths ranging anywhere from a few inches to several feet, the longer detectors being naturally more sensitive since they present a greater area to the action of the gamma rays while the shorter detectors, due to their higher resolving power, permit of the accurate logging of very thin formations. It has been demonstrated that with a high efficiency detector of the type described, of about three inches in diameter and five feet in length, a logging velocity of 3000 feet per hour results in a percentage error of 2.5%. When the speed is increased to 6000 feet per hour the error is 3.5%, and this shows that the error actually increases rather slowly with an increase in speed; however, while a detector five feet long will thus produce an accurate log when moving through the hole at a speed of 6000 feet per hour, it will not have a sufficiently high resolving power to determine accurately the location of strata which are much less than five feet in thickness. In order to obtain an accurate indication of a formation, say 15" in thickness, the detector should not be substantially more than 15" in length.

In accordance with the invention a method of hole logging has been provided in which a pair of high efficiency radiation detectors disposed in a single housing suspended from a suitable cable are adapted to be passed through the hole to be logged. The pulses from the detectors are conducted upwardly through the cable, being impressed thereupon in such manner that, by suitable devices at the surface, the pulses from either detector may be separately indicated or recorded, or if desired the total of the pulses from both detectors may be indicated or recorded. In the latter case, the effect secured is that of a single detector of a length equal to the combined length of the two detectors, and because of this effect, the instrument containing the two detectors may be passed through the hole at a high speed, say of 4000 to 5000 feet per hour or higher, and an accurate log will be obtained. When it is indicated that a thin formation is present, less in thickness than the combined length of the detectors, it may be logged at a slower speed, say of about 1000 feet per hour, while recording only the pulses from one of the detectors, preferably the shorter, and because of its higher resolving power, an accurate record is made of the nature and location of the thin formation.

For a better understanding of the invention reference may be had to the following description, illustrated by the accompanying drawings in which:

Fig. 1 is a vertical sectional elevation through a well or bore-hole showing a radiation detecting instrument in accordance with the present invention, suspended within the hole;

Fig. 2 is a diagrammatic sectional view of the instrument shown in Fig. 1, on somewhat enlarged scale;

Fig. 3 is a diagram of the detector and amplifying circuits used within the instrument; and Fig. 4 is a diagram illustrating the selecting and amplifying circuits employed at the surface in accordance with the present invention.

Referring to the drawings, and more particularly to Figs. 1 and 2, a bore-hole or well 10 is shown as having been drilled through formations or strata such as 12, 14, 16, 18 and 20. For purposes of illustration it is understood that the formation 18 is fairly thin, say, about 15" in thickness and that each of the other formations 12, 14, 16 and 20 is at least three to five feet in thickness.

A housing 22, which may be of any suitable material and construction, preferably of metal, is adapted to be lowered and raised through the hole by means of a cable 24 passing over a measuring device or reel 26. Within the housing 22 are disposed a pair of elongated radiation detectors 28 and 30 sensitive to gamma radiation and preferably of the pulse-producing type such as is disclosed in the aforementioned patent of D. G. C. Hare No. 2,397,071. The detector 30 may suitably be, say 2½ to 3 feet in length and the detector 28 about 15". These dimensions are by way of example and correspond to the dimensions of an instrument which has been used in actual service in accordance with the invention described herein. The detectors may be of other lengths, but it is preferred that the shorter be about one-third to one-half as long as the longer detector and of a length substantially equal to the thickness of the thinnest stratum to be logged.

A power pack or power converting means 31 is provided within the instrument to convert the current from the power source into the necessary voltages for operation of the instrumentalities within the housing 22. The high voltage for operation of the detectors 28 and 30 is impressed upon them from the power pack 31 through the conductors 32 and 33, respectively. The output signals from the two detectors 28 and 30 are conducted to the amplifying channels 34 and 35 respectively. The signals or pulses from the detector 28 pass to amplifier 34 through the conductor 62 and the conductor 66; and the output pulses from the detector 30 are conducted to the amplifying channel 35 through the conductor 62' and the conductor 66'. The necessary direct current voltages for operating the amplifying tubes in the amplifier channels 34 and 35 are supplied from the power pack 31 through the conductors 76, 82 and 85.

The cable 24 is preferably of the single-conductor, shielded type having a central conductor and a shield which serves as a return or ground for the various circuits involved. As shown in Fig. 2, in which the lower portion of the cable is shown on a somewhat larger scale, the central conductor in the cable 24 is designated by the numeral 25 and the shield, which is electrically connected with the shell or housing 22 of the instrument, is designated by the numeral 27. The instrument housing 22 thus may serve as a return or ground for the various circuits and constitutes a base point of common direct current potential for the various circuits and instrumentalities within the housing. The current for the operation of the various instrumentalities within the housing 22 is supplied through the cable from a suitable source at the surface, designated by the numeral 44. As illustrated, this may be a source of alternating current. Within the instrument, current for the operation of the various instrumentalities within the instrument housing 22 is taken off of the conductor 25 in the cable through the conductor 46 to the power pack 31, the return being through the conductor 47 to the housing 22.

The amplifier channels 34 and 35 may be of any suitable type, for example, as disclosed in the U. S. Letters Patent of D. G. C. Hare No. 2,381,904, granted August 14, 1945, in which the pulses from the detectors 28 and 30 serve to modulate carrier current frequencies generated by oscillators within the amplifier, these modulated carriers then being conducted upwardly through the cable 24 to the equipment at the surface. However, it is preferred that the amplifier channels 34 and 35 be of a type yielding amplified and equalized pulses which are capable of being differentiated by suitable equipment at the surface. Preferably, in accordance with the present invention, the amplifying channels 34 and 35 respectively yield pulses of different amplitudes, all of which are delivered through the conductors 51 and 52 to primary coils 53 and 54, respectively, of a transformer 55 having a common secondary coil 103 in series connection with the cable conductor 25, so that all of the amplified output pulses from the detectors are transmitted to the cable 24 and by it carried to the surface. Circuits which may be employed in the amplifier channels 34 and 35 are more fully illustrated and described in connection with Fig. 3 of the drawings.

The amplified pulses from the logging instrument, which are taken from the cable at the surface in the usual manner at the cable spooling mechanism, indicated generally at 26ª, are first directed to a filter 56 which separates the pulses from the supply current, and then pass to a selector 57 in which circuits are provided whereby the total of the pulses derived from both detectors may be transmitted to the amplifier 58 or, if desired, the individual pulses from either one or both of the detectors may be transmitted separately to the amplifier. The circuits in the selector 57 are shown in Fig. 4.

The pulses transmitted to the amplifier 58 are there further amplified and transmitted to the recorder 59, where they are correlated with indications of the depth of the instrument, transmitted from the reel 26, these indications being transmitted in known manner.

In Fig. 3, the circuits for the detectors 28 and 30 are shown. In this drawing, the detectors are illustrated schematically by a conventional representation of their electrodes. The circuits for the heating filaments for the various electronic tubes are not shown, since such circuits are well-known and their showing would unnecessarily complicate the drawings. Where ground connections are conventionally illustrated, it is to be understood that these are connections to the base point of common potenial which will in general be the housing of the instrument.

In the circuits illustrated in Fig. 2, the pulses derived from each of the detectors, resulting from radioactivity effects, are amplified and equalized through similar individual circuits, of which one will be described in detail and corresponding parts in the other will be indicated by the same numerals, carrying a prime ('). The amplified pulses from one of the detectors, preferably the longer one, 30, are reduced in amplitude before being impressed upon the transmitting cable 24.

A high direct current potential, somewhat above that required for operating the detectors, is drawn from the power pack through the conductors 32 and 33 to be impressed upon the anodes of the detectors 28 and 30, respectively. This high potential is impressed upon the detector 28 through the resistor 60 and conductors 61 and 62. It is also impressed upon the plate circuit of a high vacuum electronic tube 63, which is interconnected with a second high vacuum electronic tube 64 in multivibrator relationship, as disclosed in the application of Donald G. C. Hare, Serial No. 581,647, filed March 8, 1945.

The plate 65 of tube 63 thus has impressed upon it through the conductor 66 the same high voltage as is impressed upon the anode of the detector. The plate of tube 63 and the anode of the detector are coupled through the condenser 69 with the control grid 68 of the second tube 64 of the multivibrator. The condenser 69 blocks the transmission of direct current voltage to the control grid 68 of tube 64, but permits the transmission of pulses resulting from the action of the detector 28. The plate 70 of tube 64 is coupled through condenser 74 with the control grid 73 of tube 63. Condenser 74 permits the transmission of pulses from the plate circuit of tube 64 to the control grid of the tube 63 while blocking direct current flow.

The cathode 74 of tube 63 is connected to a suitable point of low potential. For example, it may be connected through the conductor 75 with a conductor 76 carrying a suitable low potential, somewhat above ground potential. The control grid 73 of tube 63 is biased by connecting it through resistor 77 to the housing or ground. The cathode 76 of tube 64 is connected to ground, and the control grid 68 of tube 64 is kept at zero bias by the connection through resistor 78 to ground. The necessary voltage for the plate 70 of tube 64 is supplied through resistors 80 and 81 from a source of suitable direct current voltage in the power pack, through the conductor 82.

As illustrated in Fig. 3, the tubes 63 and 64 may be pentodes, for example, such as 7C7 tubes. The voltage for their respective screen grids 83 and 84 is derived from a suitable source of the necessary direct current voltage in the power pack, through conductor 85. The suppressor grids 88 and 89 are each connected with their respective cathodes.

As will be apparent, the plate operating voltage for the tube 63 will be that directly applied to the anode of the detector 28. In a particular case employing one of the types of high efficiency detectors previously referred to, this voltage may be in the order of 1000 volts. A low direct current voltage, derived from the conductor 76, and which may be in the order of, say, 22 volts is impressed upon the cathode 74 of tube 66, in order that a substantial bias may be placed upon the control grid of this tube 63. A somewhat lower plate operating voltage is placed upon the plate 70, this suitably being in the order of 200 volts. The discharges resulting from the action of the detector 28 produce negative pulses which are impressed upon the control grid 68 of tube 64. These in turn produce positive pulses in the plate circuit of tube 64 which are transmitted to the control grid 73 of tube 63. This results in a reduction in potential at its plate 65 and an enhancement of the effect of the pulses produced by the detector, and the production at the output of the tube 64, of positive pulses of substantially equalized amplitude, as more fully described in the aforesaid application of Hare, Serial No. 581,647. At the same time, as pointed out in that application, through the modified multivibrator circuits employed, rapid quenching of the detector is secured and it is made sensitive to very small and very rapid pulses. As pointed out above, the same circuits are employed and the same results are secured in connection with the operation of detector 30 as those which have been described in connection with detector 28.

The amplified and equalized pulses which are secured from each of the detectors are then further amplified through the amplifying tubes 90 and 90', which are power amplifiers, suitably pentodes such as 6AG7 tubes and preferably operated at about cut-off, yielding substantially equalized output pulses. The positive pulses coming from the plate of the tube 64 are impressed upon the control grid 91 of amplifier tube 90 through condenser 93. The cathode 94 of tube 90 is connected to the same source of low potential (conductor 76) as is the cathode of tube 63, this connection being effected through the conductor 95. The control grid 91 of tube 90 is biased by being connected through resistor 96 to ground.

A similar power amplifying tube 90' is provided in connection with the circuits for the detector 28, and corresponding parts of and connections for this amplifier are indicated by the same numbers applied to those of amplifier 90, with the addition of a prime. However, means are provided for attenuating or reducing the amplitude of the pulses delivered by one of the detectors, these being shown in Fig. 3 in connection with the circuits for detector 30, which represents the longer detector in the instrument.

Referring to the circuit for the detector 28, the amplified pulses from the amplifying tube 90 are transmitted from the plate 97 of this tube through the conductor 51 to the primary coil 53 of the transformer 55, the opposite end of this coil being connected with the conductor 82, from which the necessary voltage for operation of the plate circuit of tube 90 is thus supplied.

The tube 90', which amplifies the pulses from the detector 30, delivers amplified pulses from its plate 97' through conductor 52 to a second primary coil 54 on transformer 55, the opposite end of this coil being connected directly with the conductor 82 supplying the necessary plate operating voltage for the tube 90'. A resistor 100 is series-connected in the line 52 and a second resistor 101 is connected in shunt or parallel with the primary coil 54 between the conductor 52 and the conductor 82 through the conductor 102. It is thus apparent that the resistors 101 and 100 form an attenuator, which serve to attenuate or reduce the amplitude of the pulses impressed upon the primary coil 54 of transformer 55.

The transformer 55 has a single secondary coil 103, which is connected in series with the cable conductor 25, a choke coil 104 being shunted across this secondary to by-pass the power current, which is an alternating current of low frequency, and prevents it from reacting back upon the pulse transmitting system. As is readily apparent, the pulses transmitted through the cable conductor will thus be both the larger amplitude pulses resulting from the discharges in the detector 28 and the lower amplitude pulses resulting from the discharges in the detector 30.

As an illustrative embodiment of the circuits illustrated in Fig. 3, in which the voltage impressed across the electrodes of detectors 28 and 30 is in the order of 1000 to 1100 volts, the voltages impressed upon conductors 82, 85 and 76 may be respectively 200 volts, 45 volts and 22 volts. The constants of the multivibrator circuits comprising the tubes 63 and 64 and the tubes 63' and 64' respectively may be as set forth in the aforesaid application of Hare, Serial No. 581,647. The impedances of primary coils 53 and 54 may be in the order of 500 ohms each and of secondary coil 103 in the order of 50 ohms. The resistances of resistors 100 and 101 may be selected to secure the desired radiation in amplitude of the pulses; for example, they may be 2000 and 5000 ohms respectively.

As has been hereinbefore stated, when these pulses reach the surface, after passing through a filter which eliminates the alternating current supply from the pulse selecting and amplifying equipment, they pass into a selector, by which a selection may be made of the pulses to be further amplified and recorded and either the pulses or lower amplitude or those of higher amplitude or the total of both may be selected for recording, suitably after further amplification. The selector circuits are more fully illustrated in Fig. 4

As shown in this figure, the cable conductor 25 is coupled through condenser 105 with the filter 56, of which details are not shown, as these are well-known in the art. This filter serves to suppress the frequency of the current from the alternating current source 44, which may suitably be 60 cycles. From the filter 56 pulses are impressed upon a conductor 107, from which, through a hand operated switch 108, they may be impressed either upon conductor 109 or conductor 110. The switch is shown in position for transmitting the pulses to the conductor 109, in which case either the total of the pulses transmitted by the cable or only the pulses of larger amplitude may be recorded, as desired. The selection between these alternatives is made as hereinafter indicated.

The conductor 109 is connected through a condenser 111 and conductor 112 with the control grid 113 of an amplifying tube 114, suitably a high-mu triode or one unit of a duplex triode such as a 7F7 tube. A suitable operating voltage is impressed upon the plate 115 of the tube 114 through the resistor 116; and the cathode 118 of tube 115 is grounded.

In order that a selection of pulses may be made between the total pulses and the pulses of larger amplitude, provision is made for varying the bias voltage placed on the control grid of the tube 114. By use of a lesser bias on this tube, all of the pulses, both of larger and smaller amplitude, delivered from the cable 25, can be caused to produce pulses in the plate circuit of tube 114. By increasing the negative bias on the control grid 113 of tube 114, the effect of pulses of smaller amplitude is eliminated and only the pulses of larger amplitude produce pulses in the plate circuit of tube 114. This change in bias on the control grid of tube 114 may be effected in any desired manner, one circuit suitable for this purpose being illustrated. In this, the bias on the control grid 113 of tube 114 is provided by the battery 120 and potentiometer 121 from which the desired negative voltage may be taken by means of switch 122, to be impressed on the control grid 113 of tube 114. According to the negative bias applied, the tube responds to all of the pulses delivered from the cable or only to those of larger amplitude. Since, in the circuits illustrated in Fig. 2, the pulses of larger amplitude are those produced by the shorter detector 30, it is apparent that by proper selection of the bias voltage on the tube 114, the latter can be made to respond only to the pulses resulting from the action of the shorter detector.

The pulses resulting from the action of the tube 114 are delivered to the amplifier system 58 and the recorder 59, in which they may be amplified and recorded in usual manner.

In some cases, it may be desired to record the pulses of smaller magnitude alone or to record them independently of the pulses of larger magnitude delivered from the cable 25. Suitable circuits for accomplishing this are also shown in Fig. 4. In such case, the control switch is thrown to contact the terminal of the conductor 110. The pulses are then impressed on the conductor 110 and are transmitted to the control grids 132 and 133 of two high vacuum electronic tubes 134 and 135, shown as triodes, suitably triode units of a tube of the 7F7 type. The plates 136 and 137 of the tubes 134 and 135 respectively have impressed upon them the necessary plate operating voltage through conductors 138 and 139, both of which are connected at a common point 140 with a conductor 141 which is in turn connected through a load resistor 142 and conductor 143 with a suitable source of plate operating voltage.

Tube 134 has its control grid 132 biased, for example, by means of biasing battery 144 and biasing resistor 145. Tube 135 has its control grid 133 biased by means of the biasing battery 146 and resistor 147. The negative bias voltage on the control grid of the tube 135 is greater than that on the tube 134, being adjusted so that the pulses of smaller amplitude do not cause plate current to flow in this tube, although the pulses of larger amplitude cause plate current to flow therethrough. The bias on the control grid of the tube 134 is so adjusted that plate current is caused to flow through this tube by either the pulses of smaller amplitude or those of larger amplitude.

The primary winding 148 of a transformer is connected in series in the plate circuit of the tube 134 and its secondary winding 149 is coupled through a condenser 150 to the amplifier 58.

When a small pulse is delivered from the transmission cable conductor 25 to the conductor 110, it causes current to flow in tube 134, producing a pulse in the plate circuit of this tube, which is transmitted through the transformer coils 148 and 149 to the conductor 150 and thereby to the amplifier 58. When a pulse of larger amplitude is delivered to the conductor 110, plate current is caused to flow through the tube 135 as well as the tube 134. The tube 135 is selected so that the plate current which flows through it under these circumstances will cause a substantial drop in voltage at the common point of connection 140 of the plate circuits of both tubes with the plate resistor 141. As a result, the plate voltage on the tube 134 will be lowered to such an extent that there is no substantial amplification of the pulse delivered to the control grid 132 of this tube. In order to insure that this effect will take place, it is preferred that there be a small time delay between the operation of tube 135 and 134, which may be effected by selecting the constants of the coupling condenser and grid resistor in the control grid circuit of tube 134 so that their product is somewhat greater than the product for the corresponding constants of tube 135. In this way only the small pulses taken from the cable conductor 25 will cause the production of a pulse of appreciable size in the conductor 150 and hence in the amplifier 58 and recorder 59.

It is thus apparent, by a suitable selection of the positions of switch 108 and tap 122 it is possible to amplify and record the pulses from either detector in the well-logging instrument or the total of the pulses from both. Although in the specific illustration shown the smaller pulses are derived from the longer detector and the larger pulses from the smaller detector, the reverse arrangement may be used. It is also readily apparent that the selector system of the present invention may be used in connection with instruments containing a plurality of detectors of the same length. Also, by suitable connections to separate amplifying and recording systems, by the circuits of the present invention, the pulses from the detectors may be individually amplified and recorded or they may be separately recorded at the same time, and correlated with suitable indications or recordings of the depth of the instrument.

Additional detectors may be present in the detector and by reversing the polarity of their pulses when applied to the transmission cable, they may be separated by suitable equipment at the surface. Thus, up to four detectors may be carried by the well-logging instrument, each pair giving pulses of the same polarity but of different amplitudes, and the resulting pulses of each polarity may then be handled in accordance with the present invention.

The invention has been described in connection with the use of radiation detectors for the detection of natural gamma radiation. By providing a suitable source of penetrating radiation in or associated with the instrument containing the detectors and properly shielded therefrom, the radiations acting upon the detectors are modified or influenced thereby and the induced radiations are detected and recorded. The source of radiation thus used may be any suitable source of penetrating radiations, such as gamma rays or neutrons. By suitable modification the detectors may be caused to respond to other radiation than to gamma rays; for example, by coating the interior thereof with a boron or lithium compound or including boron trifluoride in the gas contained therein they may be caused to respond to slow neutrons, by filling the counter with hydrogen or by coating the cathodes with a hydrogen-containing material such as paraffin wax or with indium, they may be caused to respond to fast neutrons.

Although the invention has been described in connection with the details of specific embodiments thereof, it is not intended to thereby limit the invention except in so far as such details are included in the accompanying claims.

What I claim is:

1. A method of logging a bore-hole which comprises moving through said hole a pair of vertically elongated radiation detectors of different lengths, one of said detectors being substantially as long as the vertical dimension of the thinnest stratum to be logged, recording the output of said one detector while the detectors are moving through the hole in the vicinity of a thin stratum, and recording the total output of both detectors while the detectors are moving through other portions of the hole.

2. A method of logging a bore-hole which comprises moving through said hole a pair of vertically elongated radiation detectors of different lengths of the counter type, the shorter of said detectors being approximately as long as the vertical dimension of the thinnest stratum to be logged and the longer detector being substantially three times as long as the shorter detector, recording the output of the shorter detector while said housing is moving through the hole in the vicinity of a thin stratum, and recording the total output of both detectors while the housing is moving through other portions of the hole.

3. A method of logging a bore-hole which comprises moving through said hole an instrument containing a pair of vertically elongated radiation detectors of different lengths, the shorter of said detectors being substantially as long as the vertical dimension of the thinnest stratum to be logged, recording the output of the shorter detector while said instrument is moving through the hole in the vicinity of a thin stratum at a comparatively slow speed, and recording the total output of both detectors while the instrument is moving through other portions of the hole at a higher speed whereby the thin and the thick strata will be logged with substantially the same accuracy.

4. The method of making an accurate radiological log of a bore-hole which comprises passing through said hole a device including two sensitive radiation detectors of the counter type, said detectors being of substantially different lengths, moving said device at a speed of approximately 1000 feet per hour while formations varying from one to five feet in thickness are being traversed while recording the response of the shorter of said detectors and moving said device at a speed of at least 4000 feet per hour while traversing formations greater than five feet in thickness while recording the total of the responses of both detectors in correlation with the depth of the instrument.

5. An apparatus for making a radiological log of the formations traversed by a bore-hole, which comprises a housing suspended in said hole by means of a single conductor cable, a pair of elongated radiation detectors of substantially different lengths disposed in said housing, means in said housing adapted to connect either of said detectors to said cable, the shorter of said detectors being substantially as long as the vertical dimension of the thinnest stratum to be logged, filtering and recording means at the surface connected to said cable for separately recording the output signals from one of said detectors and the total of the output signals from both of said detectors, means at the surface connected to said cable for supplying electrical energy to said detectors, and means for lowering and raising said housing in said hole so that said detectors will be exposed to radiation emitted from said formations.

6. A method of logging bore-holes which comprises passing along the bore-hole a plurality of radiation detectors of the pulse-producing type, separately amplifying and equalizing the output pulses of said detectors, reducing the amplitude of the amplified pulses from one of said detectors, combining said amplified pulses in a single conductor, conducting said pulses to the surface, and selectively recording values, one of which is a function of the pulses from one of said detectors and another of which is a function of the total of said pulses.

7. A method of logging bore-holes which comprises passing along the bore-hole a plurality of radiation detectors of the pulse-producing type, separately amplifying and equalizing the output pulses of said detectors, reducing the amplitude of the amplified pulses from one of said detectors, combining said amplified pulses in a single conductor, conducting said pulses to the surface, and selectively recording values, one of which is a function of the amplified pulses of greater amplitude from one of said detectors and another of which is a function of the total of said pulses.

8. A method of logging bore-holes which comprises passing along the bore-hole a plurality of radiation detectors of the pulse-producing type, amplifying the output pulses of each detector to a constant magnitude which is different for the pulses of each detector, combining said amplified pulses in a single conductor, conducting said pulses to the surface, and selectively recording values, one of which is a function of the pulses from one of said detectors and another of which is a function of the total of said pulses.

9. A method of logging bore-holes which comprises passing along the bore-hole a plurality of radiation detectors of the pulse-producing type, amplifying the output pulses of each detector to a constant amplitude which is different for the pulses of each detector, combining said amplified pulses in a single conductor, conducting said pulses to the surface, and selectively recording values, one of which is a function of the pulses of greater amplitude from one of said detectors and another of which is a function of the total of said pulses.

10. A method of logging bore-holes which comprises passing along the bore-hole a plurality of radiation detectors of the pulse-producing type, amplifying the output pulses of each detector to a constant amplitude which is different for the pulses of each detector, combining said amplified pulses in a single conductor, conducting said pulses to the surface, and selectively recording values, one of which is a function of the pulses of lesser amplitude from one of said detectors and another of which is a function of the total of said pulses.

11. An apparatus for logging bore-holes which comprises an instrument housing adapted to pass through the bore-hole, a plurality of radiation detectors of the pulse-producing type, means in said housing for amplifying the output of each detector to produce amplified and equalized pulses, means in said housing for attenuating the amplified pulses derived from one of said detectors, means for combining the output of said detectors and transmitting them to the surface, recording means at the surface, and means for delivering the pulses to the recording means, said means including means for selectively eliminating from the pulses delivered to the recording means the pulses from one of said detectors by the relative amplitudes thereof, whereby either the total of the pulses or only the pulses of greater amplitude are recorded.

12. An apparatus for logging bore-holes which comprises an instrument housing adapted to pass through the bore-hole, a plurality of radiation detectors of the pulse-producing type, means in said housing for amplifying the output of each detector to produce amplified and equalized pulses, means in said housing for attenuating the amplified pulses derived from one of said detectors, means for combining the output of said detectors and transmitting them to the surface, recording means at the surface, and means for delivering the pulses to the recording means, said means including means for selectively eliminating from the pulses delivered to the recording means the pulses of reduced amplitude, whereby either the total of the pulses or only the pulses of greater amplitude are recorded.

13. An apparatus for logging bore-holes which comprises an instrument housing adapted to pass through the bore-hole, a plurality of radiation detectors of the pulse-producing type means in said housing for amplifying the output of each detector to produce amplified and equalized pulses, means in said housing for attenuating the amplified pulses derived from one of said detectors, means combining the output of said detectors and transmitting them to the surface, recording means at the surface, means for delivering the pulses to the recording means, said means including means for selectively eliminating from the pulses delivered to the recording means the pulses of greater amplitude, whereby either the total of the pulses or only the pulses of lesser amplitude are recorded.

14. An apparatus for logging bore-holes which comprises an instrument housing adapted to pass through the bore-hole, a plurality of radiation detectors of the pulse-producing type means in said housing for amplifying the output of each detector to produce amplified and equalized pulses, means in said housing for reducing the amplitude of the amplified pulses derived from one of said detectors relative to those derived from the other, means for combining the amplified pulses from said detectors and transmitting them to the surface, recording means at the surface, means for delivering the pulses to the recording means, said means including an electronic tube having a biased control grid, and means for varying the bias voltage on the control grid of said tube, thereby selectively eliminating from the pulses delivered to the recording means the pulses of reduced amplitude, whereby either the total of the pulses or only the pulses of greater amplitude are recorded.

15. In apparatus for selecting pulses of lesser amplitude from unidirectional pulses of varying amplitudes, a pair of high vacuum electronic tubes, each having a control grid and means for impressing a negative bias voltage thereupon, the negative bias voltage impressed on the control grid of one of said tubes being greater than that on the control grid of the other, connections from the plates of said tubes to a common plate load resistor from which plate current is provided for both of said tubes, means for varying the pulses of varying magnitude upon the control grids of both of said tubes, whereby the tube having the control grid with greater bias is caused to pass current by the pulses of greater amplitude and to thereby reduce the plate operating voltage on the other tube which has its bias adjusted to a point where it becomes conducting by the smaller pulses, coupling means for delaying the pulses delivered to the tube with smaller bias compared to the pulses delivered to the tube of larger bias so that the tube with smaller bias produces substantial pulses only when its control grid receives pulses of smaller amplitude, and means for transmitting such pulses from the plate circuit of said other tube.

GERHARD HERZOG.

REFERENCES CITED

The following references are of record in the file of this patent:

UNITED STATES PATENTS

| Number | Name | Date |
|---|---|---|
| 2,298,794 | Howell | Oct. 13, 1942 |
| 2,369,550 | Frosch | Feb. 13, 1945 |
| 2,370,162 | Hare | Feb. 27, 1945 |
| 2,378,408 | Herzog | June 19, 1945 |
| 2,408,063 | Grieg | Sept. 24, 1946 |
| 2,419,548 | Grieg | Apr. 29, 1947 |